May 10, 1960
C. E. MAINES
2,935,817
GARDEN TOOL
Filed Dec. 14, 1954
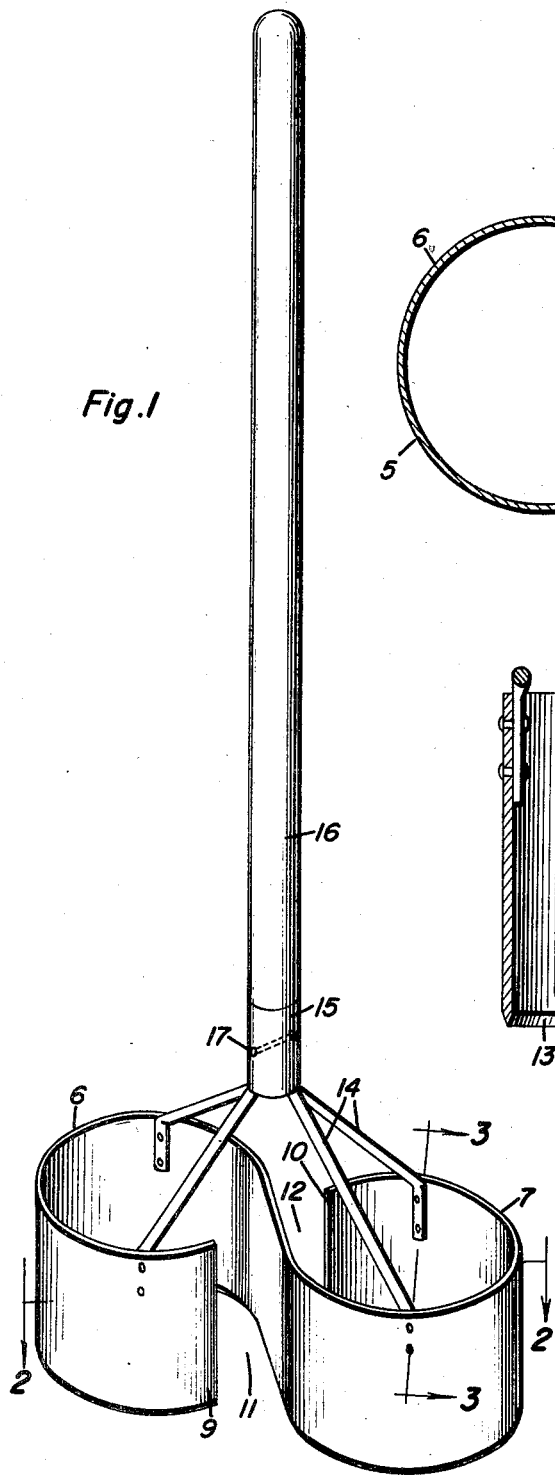
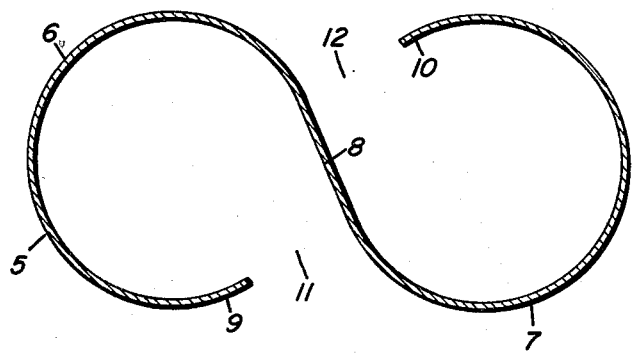
Charles E. Maines
INVENTOR.

United States Patent Office 2,935,817
Patented May 10, 1960

2,935,817

GARDEN TOOL

Charles E. Maines, Denver, Colo.

Application December 14, 1954, Serial No. 475,026

1 Claim. (Cl. 47—1)

The present invention relates to new and useful improvements in garden tools, and more particularly to a plant protector.

An important object of the invention is to provide a protector of substantially S-shape to form a blade of double circular construction for placing over and protecting a pair of closely growing plants while the weeds adjacent the plants are being cut and destroyed.

Another object of the invention is to provide a tool of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view;

Figure 2 is a transverse sectional view taken on a line 2—2 of Figure 1; and

Figure 3 is an enlarged vertical sectional view taken on a line 3—3 of Figure 1.

Referring now to the drawings in detail, wherein for the purpose of illustration, I have disclosed a preferred embodiment of my invention, the numeral 5 designates a substantially S-shaped blade constructed of sheet metal or strap metal to form a pair of circular protector members, or portions 6 and 7 of elongated cylindrical form.

The circular weeding members 6 and 7 are united to each other by a central portion of the blade, as shown at 8, and terminate in side edges 9 and 10 of the circular protector members which are spaced outwardly at opposite sides of the central portion 8 to provide openings 11 and 12 in each of the circular protector members 6 and 7 through which members plants may be passed into said members by placing the members downwardly over said plants.

The lower edge of the blade is beveled to form a cutting edge 13 on the lower edge of said circular members 6, 7 and the central portion 8.

A plurality of brace rods 14 are connected at one end portion of each thereof to the upper portion of the circular protector members 6 and 7, and the rods converge upwardly above the center of the blade 5, with the upper portion of the rods welded or otherwise suitably secured to a ferrule 15 to which a handle 16 is attached by means of a transverse pin 17 and centered between the members 6, 7. At least one of the rods 14 is attached adjacent the end portions 9 and 10 of the circular protector members 6 and 7 to effectively brace the side edges 9, 10 of the members 6, 7

The tool is designed to be used in protecting young, closely growing plants, not shown, for instance, plants newly sprouted, and while weeds are being pulled up around said plants. For this purpose the blade 5 is thrust downwardly into the ground with the cylindrical members, or portions, 6, 7 surrounding two adjacent closely growing plants and with the portion 8 disposed between the plants. The blade 5 is then shoved or thrust into the ground to a sufficient depth to hold the tool upright. The weeds around the cylindrical members, or portions, 6, 7 may then be pulled without injury to the plants. In case the spacing of plants in the row is such that the cylindrical members, or portions, 6, 7 encompass at least two plants in the row and the cylindrical members, or portions, 6, 7 opposite the central portion 8 would contact and possibly injure one or more plants in the row, either cylindrical member, or portion, 6, 7 may be used selectively to protect a single plant by entering the plant into the selected member, or portion, 6, 7 through the opening 11 or 12, as the case may be, and then thrusting the blade 5 into the ground. Optionally, either cylindrical member, or portion, 6, 7 may be positioned downwardly over such a lower plant.

What is claimed as new is as follows:

A garden tool comprising an S-shaped blade of uniform width including a pair of upstanding circular portions of elongated hollow cylindrical form for positioning around young plants and an intermediate central portion uniting the cylindrical portions, said circular portions being spaced apart laterally at opposite sides of the intermediate portion and terminating in side edges spaced from the intermediate portion to provide spaces between said edges and said intermediate portions through which plants may be passed into said circular portions, said portions having a lower cutting edge for penetrating into the ground, a handle spaced above and centered between said circular portions, and braces inclining upwardly from upper edges of said cylindrical portions to said handle.

References Cited in the file of this patent

UNITED STATES PATENTS

| 84,692 | Halleck | Dec. 8, 1868 |
| 485,832 | Baldridge | Nov. 8, 1892 |

FOREIGN PATENTS

| 815,119 | Germany | Sept. 27, 1951 |
| 173,188 | Great Britain | Dec. 29, 1921 |